(12) United States Patent
Osburn et al.

(10) Patent No.: US 9,429,062 B2
(45) Date of Patent: Aug. 30, 2016

(54) METHOD AND ALGORITHM FOR PERFORMING AN NH3 SENSOR RATIONALITY DIAGNOSTIC

(71) Applicant: Cummins Inc., Columbus, IN (US)

(72) Inventors: Andrew W. Osburn, Nashville, IN (US); Feng Liu, Greenwood, IN (US); Mert Geveci, Delmar, NY (US)

(73) Assignee: Cummins Inc., Columbus, IN (US)

( * ) Notice: Subject to any disclaimer, the term of this patent is extended or adjusted under 35 U.S.C. 154(b) by 15 days.

(21) Appl. No.: 14/479,643

(22) Filed: Sep. 8, 2014

(65) Prior Publication Data

US 2014/0373511 A1 Dec. 25, 2014

Related U.S. Application Data

(63) Continuation of application No. PCT/US2013/029675, filed on Mar. 7, 2013.

(60) Provisional application No. 61/607,703, filed on Mar. 7, 2012.

(51) Int. Cl.
- *F01N 3/00* (2006.01)
- *F01N 11/00* (2006.01)
- *B01D 53/94* (2006.01)

(Continued)

(52) U.S. Cl.
CPC ............ *F01N 11/00* (2013.01); *B01D 53/9431* (2013.01); *B01D 53/9495* (2013.01); *F01N 3/103* (2013.01); *F01N 3/208* (2013.01); *F01N 3/2066* (2013.01); *F01N 2560/021* (2013.01); *F01N 2560/026* (2013.01); *F01N 2900/0416* (2013.01); *Y02T 10/24* (2013.01); *Y02T 10/47* (2013.01)

(58) Field of Classification Search
USPC ......... 60/274, 276, 277, 286, 295, 297, 301, 60/303
See application file for complete search history.

(56) References Cited

U.S. PATENT DOCUMENTS

| 5,864,773 A | 1/1999 | Barna et al. |
| 6,876,919 B2 | 4/2005 | James et al. |

(Continued)

FOREIGN PATENT DOCUMENTS

| EP | 1793224 A2 | 6/2007 |
| EP | 2180157 A2 | 4/2010 |

OTHER PUBLICATIONS

International Application No. PCT/US2013/029675, International Preliminary Report on Patentability, Sep. 9, 2014, 7 pages.

*Primary Examiner* — Binh Q Tran
(74) *Attorney, Agent, or Firm* — Taft Stettinius & Hollister LLP (57) ABSTRACT

An example method includes interpreting an $NH_3$ composition value at a position upstream of a selective reduction catalyst (SCR) element fluidly disposed in the exhaust conduit of an engine, interpreting a $NO_x$ composition value at a position downstream of the SCR element, and determining an $NH_3$ sensor rationality threshold in response to the upstream $NH_3$ composition value. The method further includes determining an $NH_3$ sensor health value as indicating a sensor failure in response to the downstream $NO_x$ composition value exceeding the $NH_3$ sensor rationality threshold.

32 Claims, 2 Drawing Sheets

(51) Int. Cl.
*F01N 3/20* (2006.01)
*F01N 3/10* (2006.01)

(56) References Cited

U.S. PATENT DOCUMENTS

| | | |
|---|---|---|
| 7,546,761 B2 | 6/2009 | He et al. |
| 7,568,000 B2 | 7/2009 | Keyes et al. |
| 7,631,552 B2 | 12/2009 | Keski-Hynnila et al. |
| 7,757,478 B2 | 7/2010 | Wang et al. |
| 8,201,394 B2 * | 6/2012 | Chi .......................... F01N 3/106 60/276 |
| 8,336,525 B2 * | 12/2012 | Runde ................. F02D 41/1465 123/479 |
| 8,495,862 B2 * | 7/2013 | Levijoki ................. F01N 3/208 60/274 |
| 8,555,623 B2 * | 10/2013 | Yasui ...................... F01N 3/208 60/286 |
| 8,601,796 B2 * | 12/2013 | Hinz ....................... F01N 3/035 60/295 |
| 9,010,087 B1 * | 4/2015 | Upadhyay ............... F01N 3/208 60/274 |
| 2008/0022658 A1 | 1/2008 | Viola et al. |
| 2010/0024393 A1 | 2/2010 | Chi et al. |
| 2010/0024397 A1 | 2/2010 | Chi et al. |
| 2010/0101214 A1 | 4/2010 | Herman et al. |
| 2010/0107609 A1 | 5/2010 | Parmentier et al. |
| 2011/0239627 A1 | 10/2011 | Sisken et al. |
| 2011/0265452 A1 | 11/2011 | Geveci et al. |
| 2013/0139489 A1 | 6/2013 | Liu et al. |

\* cited by examiner

METHOD AND ALGORITHM FOR PERFORMING AN NH3 SENSOR RATIONALITY DIAGNOSTIC

RELATED APPLICATIONS

The present application is a continuation of International Patent Application No. PCT/US2013/029675 filed on Mar. 7, 2013, which claims the benefit of the filing date of U.S. Provisional Patent Application 61/607,703 filed on Mar. 7, 2012, each entitled METHOD AND ALGORITHM FOR PERFORMING AN NH3 SENSOR RATIONALITY DIAGNOSTIC, each of which is incorporated herein by reference in its entirety for all purposes.

BACKGROUND

The technical field generally relates to selective catalytic reduction (SCR) systems having an $NH_3$ sensor included as a control element. A failure in the $NH_3$ sensor may significantly impact the control of an SCR system relying upon the $NH_3$ sensor. Because the system relies upon the $NH_3$ sensor, in certain applications a failure of the sensor must be detected, and/or the impact of the lack of a sensor failure detection must be accounted for in an estimate of the impact of emissions of the system including the sensor. Detection of a failed $NH_3$ sensor, including at a position downstream of a reductant injector and at least a portion of the total SCR catalyst present in the system, is challenging. Therefore, further technological developments are desirable in this area.

SUMMARY

One embodiment is a unique method for determining a failed $NH_3$ sensor in an SCR aftertreatment system. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
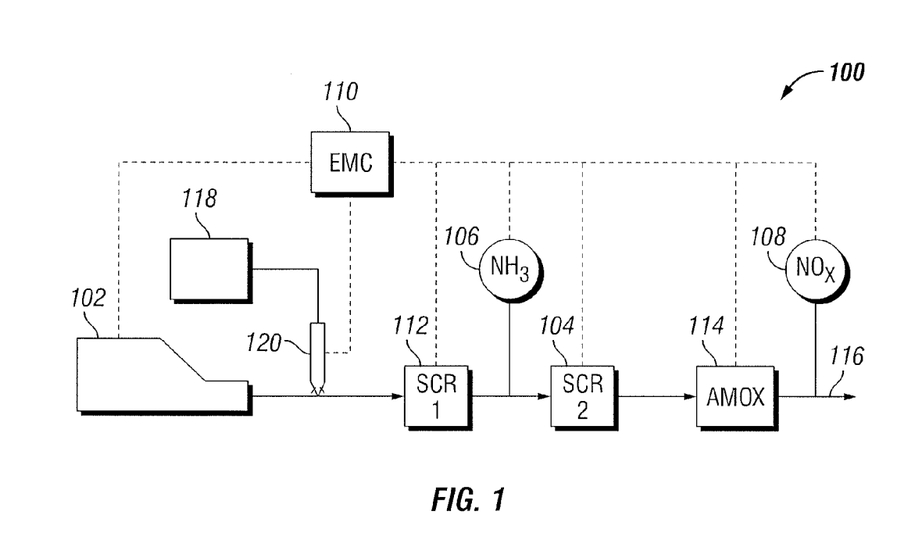
FIG. 1 is a schematic diagram of a system having an $NH_3$ sensor and a controller structured to functionally execute operations to diagnose the sensor.

Referencing FIG. 1, a system 100 includes an internal combustion engine 102 producing an exhaust stream as a byproduct of operation, an exhaust conduit 116 fluidly coupled to the engine and structured to receive the exhaust stream. The engine 102 may be any type of engine understood in the art, including a diesel, gasoline, turbine, etc., that produces $NO_x$ gases during operation. The system 100 further includes a selective reduction catalyst (SCR) element 104 fluidly disposed in the exhaust conduit 116. The SCR catalyst 104 includes an upstream side (toward the engine) and a downstream side (away from the engine).

The system 100 further includes an $NH_3$ sensor 106 operationally coupled to the exhaust conduit 116 that provides an upstream side $NH_3$ composition value. Without limitation, the NH3 sensor 106 may be utilized in controls of the system 100, for example to provide feedback to a controller 110 for operating a reductant injector 120 that injects a reductant 118 into the exhaust stream 116. The example system 100 further includes a $NO_x$ sensor 108 operationally coupled to the exhaust conduit 116 at a position downstream of the SCR element 104, where the $NO_x$ sensor 108 provides a downstream side $NO_x$ composition value.

In certain embodiments, the system 100 further includes a controller 110 (labeled ECM—electronic control module, in the example of FIG. 1) structured to perform certain operations to diagnose the $NH_3$ sensor 106. In certain embodiments, the controller 110 forms a portion of a processing subsystem including one or more computing devices having memory, processing, and communication hardware. The controller 110 may be a single device or a distributed device, and the functions of the controller 110 may be performed by hardware or software.

In certain embodiments, the controller 110 includes one or more modules structured to functionally execute the operations of the controller 110. In certain embodiments, the controller 110 includes a composition module, an $NH_3$ sensor threshold module, and an $NH_3$ sensor diagnostic module. More specific descriptions of certain embodiments of controller operations are included in the section referencing FIG. 2.

An example system 100 further includes a second SCR element 112 disposed in the exhaust conduit 116 at a position upstream of the $NH_3$ sensor 106, and/or an ammonia oxidation catalyst 114 (AMOX) disposed in the exhaust conduit 116 at a position downstream of the $NH_3$ sensor 106 and upstream of the $NO_x$ sensor 108. The first and second SCR elements 104, 112 may be two distinct catalyst "bricks" (substrate units) or a shared brick with a break or uncatalyzed zone therein, and the $NH_3$ sensor 106 is positioned therebetween. In certain embodiments, the first and second SCR elements 104, 112 may be positioned within the same outer housing or in distinct housings. The AMOX 114, when present, is provided with an oxidizing catalyst component that can oxidize a portion of any remaining reductant that slips past the second SCR element 104, for example to prevent excess ammonia from being emitted to the environment.

FIG. 3 is a schematic illustration of a processing subsystem 300 including a controller 110. The controller 110 includes a composition module 202, an $NH_3$ sensor threshold module 204, and an $NH_3$ sensor diagnostic module 206. In certain embodiments, the controller 110 further includes a testing conditions module 208. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on non-transitory computer readable medium, and modules may be distributed across various hardware or software components.

Certain operations herein are described as interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transitory computer readable medium, receiving the value as a run-time parameter by any means known in the art, and/or by receiving a value by which the interpreted parameter can be calculated, and/or by referencing a default value that is interpreted to be the parameter value.

Figure 2:
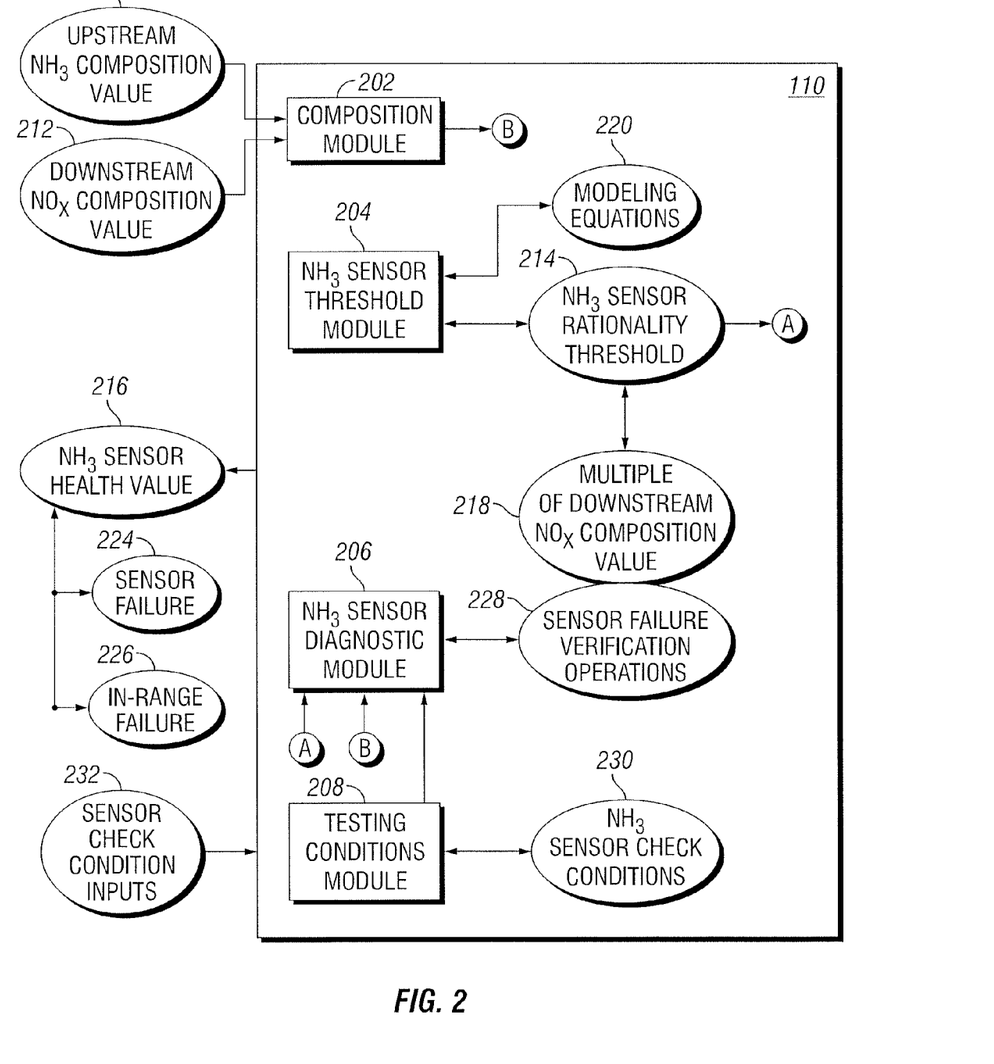
FIG. 2 is a schematic diagram of a controller structured to functionally execute operations to diagnose an $NH_3$ sensor.

The composition module 202 interprets the upstream $NH_3$ composition value 210 and the downstream $NO_x$ composition value 212. The composition values 210, 212 may be determined by any method known in the art, including sensors which provide ppm values, concentrations, and/or any other representations that correlate to and that can be used to calculate the $NO_x$ and/or $NH_3$ present. The upstream position is upstream of an SCR catalyst element, which may be the second SCR catalyst element of a pair, or any SCR catalyst element within a group of SCR catalyst elements provided in a series or parallel configuration. The $NO_x$ composition value 212 is downstream of the SCR catalyst element, and in certain embodiments may be further downstream of an oxidation catalyst such as an AMOX catalyst.

In certain embodiments, the $NH_3$ sensor threshold module 204 determines an $NH_3$ sensor rationality threshold 214 in response to the upstream $NH_3$ composition value 210, and the $NH_3$ sensor diagnostic module 206 determines an $NH_3$ sensor health value 216 in response to the downstream $NO_x$ composition value 212 and the $NH_3$ sensor rationality threshold 214. For example, an $NH_3$ sensor threshold module 204 determines the value of the upstream $NH_3$ composition value 210, determines the $NH_3$ sensor rationality threshold 214 as a function of the upstream $NH_3$ composition value 210, and determines the $NH_3$ sensor health value 216 as a positive health indicator value if the downstream $NO_x$ composition value 212 is less than the $NH_3$ sensor rationality threshold 214 and determines $NH_3$ sensor health value 216 as a negative health indicator value if the downstream $NO_x$ composition value 212 is greater than the $NH_3$ sensor rationality threshold 214.

An example system includes an SCR catalyst element, an AMOX positioned downstream of the SCR catalyst element, an $NH_3$ sensor positioned upstream of the SCR catalyst element, and a $NO_x$ sensor positioned downstream of the ammonia oxidation catalyst. Given an ammonia concentration x at the $NH_3$ sensor position, a $NO_x$ conversion efficiency of $\eta_2$ in the SCR catalyst element, and an $NH_3$ to $NO_x$ (ammonia to $NO_x$ ratio, ANR), it can be seen that the $NO_x$ concentration downstream of the SCR catalyst element at nominal operating conditions should be:

$$NOx(SCR_{downstream}) = \frac{x}{ANR}(1 - \eta_2) \qquad \text{Eq. 1}$$

Further, given an AMOX conversion efficiency of $\eta_3$, (moles $NH_3$ converted/moles $NH_3$ present at AMOX inlet), it can be seen that the $NH_3$ slipping from the AMOX should be:

$$NH_{3slip} = \left(x - \frac{x}{ANR}\eta_2\right)(1 - \eta_3) \qquad \text{Eq. 2}$$

Accordingly, an estimate for the $NO_x$ reading of the $NO_x$ sensor, assuming a conservative estimate that all of the $NH_3$ present will be detected as $NO_x$, is found in Eq. 3:

$$NOx(AMOX_{downstream}) = \frac{x}{ANR}(1 - \eta_2) + \left(x - \frac{x}{ANR}\eta_2\right)(1 - \eta_3) \qquad \text{Eq. 3}$$

In certain embodiments, if the AMOX conversion efficiency is understood to be less than or equal to 100% (i.e. 1), then Eq. 3 can be rewritten as:

$$NOx(AMOX_{downstream}) \leq \frac{x}{ANR}(1 - \eta_2) + \left(x - \frac{x}{ANR}\eta_2\right) \qquad \text{Eq. 4}$$

The value for the $NO_x$ conversion efficiency ($\eta_2$) of the SCR catalyst element varies as is known in the art, and according to the design of a particular system. Values for $\eta_2$ that exceed 50% are well known, and in many instances the $\eta_2$ will be much greater than 50%. From Eq. 4, it can be seen that a value of $\eta_2$ that is greater than or equal to 50%, and an ANR of 1, provides for:

$$NOx(AMOX_{downstream}) \leq x \qquad \text{Eq. 5}$$

In certain embodiments, the $NH_3$ sensor rationality threshold 214 is set to the value x, whereupon the $NH_3$ sensor threshold module 204 determines the $NH_3$ sensor health value 216 to be a negative health indicator value (e.g.—failed) in response to the downstream $NO_x$ composition value 212 exceeding the upstream $NH_3$ composition value 210.

An example system includes the $NH_3$ sensor diagnostic module determining the $NH_3$ sensor health value as failed in response to the equation $$NOx(AMOX_{downstream}) > \frac{x}{ANR}(1 - \eta_2) + \left(x - \frac{x}{ANR}\eta_2\right)(1 - \eta_3).$$

For example, where the downstream $NO_x$ sensor reading exceeds the expected NOx sensor reading based upon $NH_3$ present at the $NH_3$ sensor, with subtracted conversion of $NH_3$ and $NO_x$ on the SCR catalyst, and added $NO_x$ production on the AMOX catalyst, the $NH_3$ sensor is determined to be failed. The failure may be determined to be an in-range sensor failure, for example when the $NH_3$ sensor is reporting a value that is within the operational limits of the sensor but failed according to the equation.

An example system includes the NH3 sensor diagnostic module determining the NH3 sensor health value as failed in response to the equation $$NOx(AMOX_{downstream}) > \frac{x}{ANR}(1 - \eta_2) + k\left(x - \frac{x}{ANR}\eta_2\right)$$

(see Eq. 6). For example, where the downstream $NO_x$ sensor reading exceeds the expected NOx sensor reading based upon $NH_3$ present at the $NH_3$ sensor, with subtracted conversion of $NH_3$ and $NO_x$ on the SCR catalyst. It can be recognized that the equation ignoring creation of NOx on the AMOX catalyst will result in a more conservative sensor failure estimate, as the NOx sensor will tend to read a higher value due to NOx creation on the AMOX, and if ignored will more easily trigger a failure detection.

Having the benefit of the disclosures herein, it can be seen that various multiples of the "x" in Eq. 5 may be utilized as values for the $NH_3$ sensor rationality threshold 214. Without limitation, the presently known AMOX efficiency and/or the presently known $NO_x$ conversion efficiency of the SCR catalyst element ($\eta_3$) may be utilized to determine values for the $NH_3$ sensor rationality threshold 214. In certain embodiments, cutoff values for the AMOX efficiency and/or the $NO_x$ conversion efficiency of the SCR catalyst element may be utilized—for example it may be known with a high degree of confidence that the $NO_x$ conversion efficiency of the SCR catalyst element is greater than 75%, then the downstream $NO_x$ composition value 212, at an ANR of 1, should not exceed 50% of the upstream $NH_3$ composition value 210, and in one example the $NH_3$ sensor rationality threshold 214 is set to 0.5 x.

In certain embodiments, the cross-sensitivity of the $NO_x$ sensor to $NH_3$ may be accounted for, such as:

$$NOx(AMOX_{downstream}) \leq \frac{x}{ANR}(1-\eta_2) + k\left(x - \frac{x}{ANR}\eta_2\right) \quad \text{Eq. 6}$$

In Eq. 6, the k is the cross-sensitivity of the $NO_x$ sensor, for example as the ratio of the mass or moles of $NO_x$ read by the sensor per unit mass or mole of $NH_3$ present at the sensor. In certain embodiments, the presently known, estimated, or cutoff value for the ANR is utilized to determine the $NH_3$ sensor rationality threshold 214, for example as in Eq. 4. In certain embodiments, various modeling equations 220 may be present on the controller 110 and/or in communication with the controller 110, and the $NH_3$ sensor rationality threshold 214 may be determined in response to the modeling equations 220.

In certain embodiments, the $NH_3$ sensor diagnostic module 206 further determines the $NH_3$ sensor health value 216 as indicating a sensor failure 224 in response to the downstream $NO_x$ composition value 212 exceeding the $NH_3$ sensor rationality threshold 214. In still further embodiments, the $NH_3$ sensor diagnostic module further determines the $NH_3$ sensor health value 216 as indicating an in-range failure 226 in response to the upstream $NH_3$ composition value 210 being an in-range value. For example, if the upstream $NH_3$ composition value 210 is a value within an acceptable range of $NH_3$ values for the $NH_3$ sensor, but the downstream $NO_x$ composition value 212 exceeds the $NH_3$ sensor rationality threshold 214, the failure of the $NH_3$ sensor may be deemed to be an in-range failure 226.

Determining the $NH_3$ sensor health value 216 to be a negative health indicator value includes at least the operations of determining the $NH_3$ sensor health value 216 to be a sensor failure 224, an in-range failure 226, incrementing a sensor failure value, and/or setting one or more values of a set of values to indicate a failed sensor, where the set of values are averaged or otherwise aggregated to set a sensor failure indication. Determining the $NH_3$ sensor health value 216 to be a positive health indicator value includes at least the operations of determining the $NH_3$ sensor health value 216 to be a passed sensor, decrementing a sensor failure value, resetting a sensor failure value, and/or setting one or more values of a set of values to indicate a passed sensor, where the set of values are averaged or otherwise aggregated to set a sensor failure indication.

In certain embodiments, the $NH_3$ sensor rationality threshold 214 is the downstream $NO_x$ composition value. Alternatively or additionally, the $NH_3$ sensor rationality threshold is a multiple of the downstream $NO_x$ composition value 218, such as a value between 0.9 and 8.0. In certain embodiments, the $NH_3$ sensor rationality threshold 214 is a multiple of the downstream $NO_x$ composition value 218, such as a multiple selected from the list of multiples including 0.4, 0.5, 0.8, 0.9, 1.0, 2.0, 2.5, 3.0, and 8.0.

An example system further includes a testing conditions module 208 that determines whether $NH_3$ sensor check conditions 230 are present, and the $NH_3$ sensor diagnostic module 206 further determines the $NH_3$ sensor has failed in response to the $NH_3$ sensor check conditions 230 being present. Example and non-limiting $NH_3$ sensor check conditions 230 include: an SCR catalyst element storage capacity being lower than a threshold value (such as by determining a temperature of the SCR catalyst element exceeds a threshold value), the SCR catalyst element being saturated with adsorbed $NH_3$, a temperature of the SCR catalyst element exceeding a threshold, and an exhaust flow value exceeding a threshold. In certain embodiments, the NH3 sensor check conditions 230 include determining that operating conditions of the system are in a region of the system operating space wherein models for $\eta_2$, $\eta_3$, and/or NH3 storage (and/or release) in the SCR catalyst element are valid.

Alternatively or additionally, the $NH_3$ sensor diagnostic module 206 performs a sensor failure verification operation, and determines the sensor is failed further in response to the sensor failure verification operation. In certain further embodiments, the sensor failure verification operation includes one or more operations selected from the operations consisting of: averaging a number of sensor test results, incrementing a fault counter in response to a sensor test indicating a failed sensor, decrementing a fault counter in response to a sensor test indicating a passed sensor, integrating the upstream $NH_3$ composition value and the downstream $NO_x$ composition value over a predetermined period of time and comparing the integrated values to the $NH_3$ sensor rationality threshold, and modeling $NH_3$ storage on the SCR catalyst and accounting for the storage in the sensor failure verification operation.

The schematic flow descriptions which follow provide an illustrative embodiment of performing procedures for diagnosing an $NH_3$ sensor. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transitory computer readable medium, where the computer program product comprises instructions causing the computer to execute one or more of the operations, or to issue commands to other devices to execute one or more of the operations.

An example procedure includes an operation to interpret an $NH_3$ composition value at a position upstream of a selective reduction catalyst (SCR) element fluidly disposed in the exhaust conduit of an engine. The procedure further includes an operation to interpret a $NO_x$ composition value at a position downstream of the SCR element, and an operation to determine an $NH_3$ sensor rationality threshold in response to the upstream $NH_3$ composition value. The procedure further includes an operation to determine an $NH_3$ sensor health value as indicating a sensor failure in response to the downstream $NO_x$ composition value exceeding the $NH_3$ sensor rationality threshold.

An example procedure further includes an operation to determine the $NH_3$ sensor health value in response to determining that the SCR catalyst element temperature is within a $NO_x$ conversion efficiency range. Another example procedure includes an operation to determine the $NH_3$ sensor health value in response to determining that an ammonia oxidation catalyst (AMOX) positioned downstream of the SCR element is within an $NH_3$ conversion efficiency range. An example procedure further includes determining the $NH_3$ sensor health value in response to determining that the SCR catalyst element temperature is greater than a storage capacity threshold temperature. Another example procedure includes an operation to estimate a stored $NH_3$ variation value, where the operation to determine the $NH_3$ sensor health value further includes compensating for the stored $NH_3$ variation value. In certain embodiments, the stored $NH_3$ variation value is the presently estimated net rate of $NH_3$ storage on the second SCR catalyst element.

The net rate of $NH_3$ storage includes any estimated $NH_3$ storage as well as any estimated $NH_3$ release. In one example, an accumulating algorithm tracks $NH_3$ storage capacity due to temperature changes in the second SCR catalyst element, determining that $NH_3$ storage is accruing in response to, for example, an increasing storage capacity, and/or estimated excess storage capacity in the presence of $NH_3$. In one example, the accumulating algorithm determines that $NH_3$ is being released in response to, for example, a decreasing storage capacity, and/or an estimated storage capacity that is lower than a presently estimated amount of adsorbed $NH_3$.

In certain embodiments, a procedure includes an operation to determine a $NO_x$ conversion efficiency value of the SCR catalyst element, and an operation to determine the $NH_3$ sensor rationality threshold further in response to the $NO_x$ conversion efficiency value. In certain embodiments, the procedure includes an operation to determine a $NO_x$ conversion efficiency value of the SCR catalyst element and an operation to determine an $NH_3$ conversion efficiency value of an ammonia oxidation catalyst (AMOX) positioned downstream of the SCR element. The example procedure further includes an operation to determine the $NH_3$ sensor rationality threshold further in response to the $NO_x$ conversion efficiency value and the $NH_3$ conversion efficiency value.

As is evident from the figures and text presented above, a variety of embodiments according to the present invention are contemplated.

A system includes an internal combustion engine producing an exhaust stream as a byproduct of operation, an exhaust conduit fluidly coupled to the engine and structured to receive the exhaust stream, and a selective reduction catalyst (SCR) element fluidly disposed in the exhaust conduit. The SCR catalyst includes an upstream side and a downstream side. The system further includes an $NH_3$ sensor operationally coupled to the exhaust conduit that provides an upstream side $NH_3$ composition value. The system further includes a $NO_x$ sensor operationally coupled to the exhaust conduit at a position downstream of the SCR element, where the $NO_x$ sensor provides a downstream side $NO_x$ composition value.

The system further includes a controller structured to functionally execute operations to diagnose the NH3 sensor. The example controller includes a number of modules that perform operations to diagnose the sensor. The example controller includes a composition module, an NH3 sensor threshold module, and an NH3 sensor diagnostic module. The composition module interprets the upstream $NH_3$ composition value and the downstream $NO_x$ composition value, the $NH_3$ sensor threshold module determines an $NH_3$ sensor rationality threshold in response to the upstream $NH_3$ composition value, and the $NH_3$ sensor diagnostic module determines an $NH_3$ sensor health value in response to the downstream $NO_x$ composition value and the $NH_3$ sensor rationality threshold.

In certain embodiments, the $NH_3$ sensor diagnostic module further determines the $NH_3$ sensor health value as indicating a sensor failure in response to the downstream $NO_x$ composition value exceeding the $NH_3$ sensor rationality threshold. In still further embodiments, the $NH_3$ sensor diagnostic module further determines the $NH_3$ sensor health value as indicating an in-range failure in response to the upstream $NH_3$ composition value being an in-range value.

An example system further includes a second SCR element disposed in the exhaust conduit at a position upstream of the $NH_3$ sensor, and/or an ammonia oxidation catalyst disposed in the exhaust conduit at a position downstream of the $NH_3$ sensor and upstream of the $NO_x$ sensor. In certain further embodiments, the system includes a second SCR element disposed in the exhaust conduit at a position upstream of the $NH_3$ sensor. In certain embodiments, the $NH_3$ sensor rationality threshold is the downstream $NO_x$ composition value. Alternatively or additionally, the $NH_3$ sensor rationality threshold is a multiple of the downstream $NO_x$ composition value, such as a value between 0.9 and 8.0. In certain embodiments, the $NH_3$ sensor rationality threshold is a multiple of the downstream $NO_x$ composition value, such as a multiple selected from the list of multiples including 0.4, 0.5, 0.8, 0.9, 1.0, 2.0, 2.5, 3.0, and 8.0.

An example system further includes a testing conditions module that determines whether $NH_3$ sensor check conditions are present, and the $NH_3$ sensor diagnostic module further determines the $NH_3$ sensor has failed in response to the $NH_3$ sensor check conditions being present. In certain further embodiments, the $NH_3$ sensor check conditions include one or more conditions selected from the following condititions: an SCR catalyst element storage capacity being lower than a threshold value, the SCR catalyst element being saturated with adsorbed $NH_3$, a temperature of the SCR catalyst element exceeding a threshold, and an exhaust flow value exceeding a threshold. Alternatively or additionally, the $NH_3$ sensor diagnostic module performs a sensor failure verification operation, and determines the sensor is failed further in response to the sensor failure verification operation. In certain further embodiments, the sensor failure verification operation includes one or more operations selected from the operations consisting of: averaging a number of sensor test results, incrementing a fault counter in response to a sensor test indicating a failed sensor, decrementing a fault counter in response to a sensor test indicating a passed sensor, integrating the upstream $NH_3$ composition value and the downstream $NO_x$ composition value over a predetermined period of time and comparing the integrated values to the $NH_3$ sensor rationality threshold, and modeling $NH_3$ storage on the SCR catalyst and accounting for the storage in the sensor failure verification operation.

Another example set of embodiments is a method including interpreting an $NH_3$ composition value at a position upstream of a selective reduction catalyst (SCR) element fluidly disposed in the exhaust conduit of an engine, interpreting a $NO_x$ composition value at a position downstream of the SCR element, determining an $NH_3$ sensor rationality threshold in response to the upstream $NH_3$ composition value, and determining an $NH_3$ sensor health value as indicating a sensor failure in response to the downstream $NO_x$ composition value exceeding the $NH_3$ sensor rationality threshold. Certain additional or alternative operations for embodiments of the example method are described following.

An example method includes determining the $NH_3$ sensor health value in response to determining that the SCR catalyst element temperature is within a $NO_x$ conversion efficiency range. Another example method includes determining the $NH_3$ sensor health value in response to determining that an ammonia oxidation catalyst (AMOX) positioned downstream of the SCR element is within an $NH_3$ conversion efficiency range. An example method includes determining the $NH_3$ sensor health value in response to determining that the SCR catalyst element temperature is greater than a storage capacity threshold temperature. Another example method includes estimating a stored $NH_3$ variation value, where determining an $NH_3$ sensor health value further includes compensating for the stored $NH_3$ variation value.

In certain embodiments, a method includes determining a $NO_x$ conversion efficiency value of the SCR catalyst element, and determining the $NH_3$ sensor rationality threshold further in response to the $NO_x$ conversion efficiency value. In certain embodiments, the method includes determining a $NO_x$ conversion efficiency value of the SCR catalyst element, determining an $NH_3$ conversion efficiency value of an ammonia oxidation catalyst (AMOX) positioned downstream of the SCR element, and determining the $NH_3$ sensor rationality threshold further in response to the $NO_x$ conversion efficiency value and the $NH_3$ conversion efficiency value.

Another example set of embodiments is a system including an internal combustion engine producing an exhaust stream as a byproduct of operation, an exhaust conduit fluidly coupled to the engine and that receives the exhaust stream, and a selective reduction catalyst (SCR) element fluidly disposed in the exhaust conduit, where the SCR catalyst includes an upstream side and a downstream side. The system further includes an $NH_3$ sensor operationally coupled to the exhaust conduit and that provides an upstream side $NH_3$ composition value, and a $NO_x$ sensor operationally coupled to the exhaust conduit at a position downstream of the SCR element that provides downstream side $NO_x$ composition value.

The example system further includes a means for determining an $NH_3$ sensor health value in response to the upstream $NH_3$ composition value and the downstream $NO_x$ composition value. An example means for determining the $NH_3$ sensor health value further includes a means for determining an $NH_3$ sensor rationality threshold in response to the upstream $NH_3$ composition value. A further example means for determining the $NH_3$ sensor health value indicates a sensor failure in response to the downstream $NO_x$ composition value exceeding the $NH_3$ sensor rationality threshold. In still further embodiments, the means for determining the $NH_3$ sensor health value further includes a means for determining that the $NH_3$ sensor health value indicates an in-range failure. Another example embodiment includes the $NH_3$ sensor rationality threshold being one or more values selected from the values consisting of: the downstream $NO_x$ composition value and a multiple of the downstream $NO_x$ composition value, such as a value 0.9 and 8.0. Other example multiples of the downstream NOx composition value include 0.4, 0.5, 0.8, 0.9, 1.0, 2.0, 2.5, 3.0, and 8.0.

An example system includes an ammonia oxidation catalyst disposed in the exhaust conduit at a position downstream of the $NH_3$ sensor and upstream of the $NO_x$ sensor. In certain embodiments, the example system includes a means for determining whether $NH_3$ sensor check conditions are present, and a means for preventing the determining the $NH_3$ sensor health value in response to the NH3 sensor check conditions not being present. Additionally or alternatively, the system includes a means for performing a sensor failure verification operation.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an internal combustion engine producing an exhaust stream as a byproduct of operation; an exhaust conduit fluidly coupled to the engine, and structured to receive the exhaust stream; a selective reduction catalyst (SCR) element fluidly disposed in the exhaust conduit, the SCR catalyst having an upstream side and a downstream side;
    an $NH_3$ sensor operationally coupled to the exhaust conduit and structured to provide an upstream side $NH_3$ composition value;
    a $NO_x$ sensor operationally coupled to the exhaust conduit at a position downstream of the SCR element and structured to provide a downstream side $NO_x$ composition value; and
    a controller, comprising;
        a composition module structured to interpret the upstream $NH_3$ composition value and the downstream $NO_x$ composition value;
        an $NH_3$ sensor threshold module structured to determine an $NH_3$ sensor rationality threshold in response to the upstream $NH_3$ composition value; and
        an $NH_3$ sensor diagnostic module structured to determine an $NH_3$ sensor health value for the $NH_3$ sensor in response to a comparison of the downstream $NO_x$ composition value and the $NH_3$ sensor rationality threshold.

2. The system of claim 1, wherein the $NH_3$ sensor diagnostic module is further structured to determine the $NH_3$ sensor health value as indicating a sensor failure in response to the downstream $NO_x$ composition value exceeding the $NH_3$ sensor rationality threshold.

3. The system of claim 2, wherein the $NH_3$ sensor diagnostic module is further structured to determine the $NH_3$ sensor health value as indicating an in-range failure in response to the upstream $NH_3$ composition value being an in-range value.

4. The system of claim 1, further comprising a second SCR element disposed in the exhaust conduit at a position upstream of the $NH_3$ sensor.

5. The system of claim 1, further comprising an ammonia oxidation catalyst (AMOX) disposed in the exhaust conduit at a position downstream of the $NH_3$ sensor and upstream of the $NO_x$ sensor.

6. The system of claim 5, further comprising a second SCR element disposed in the exhaust conduit at a position upstream of the $NH_3$ sensor.

7. The system of claim 6, wherein the $NH_3$ sensor diagnostic module is Wither structured to determine the $NH_3$ sensor health value as failed in response to the euuation $$NOx(AMOX_{downstream}) > \frac{x}{ANR}(1-\eta_2) + \left(x - \frac{x}{ANR}\eta_2\right)(1-\eta_3);$$

wherein $NOx(AMOX_{downstream})$ comprises the downstream side $NO_x$ composition value, wherein x comprises the upstream side $NH_3$ composition value, wherein $\eta_2$ comprises a $NO_x$ conversion efficiency on the SCR catalyst, wherein $\eta_3$ comprises an AMOX conversion efficiency, and wherein ANR omprises an $NH_3$ to $NO_x$ ratio.

8. The system of claim 7, wherein the $NH_3$ sensor diagnostic. module is further structured to determine the $NH_3$ sensor health value as failed in-range in response to the $NH_3$ sensor health value being failed, and the value x being within operational limits of the $NH_3$ sensor.

9. The system of claim 6, wherein the $NH_3$ sensor diagnostic module is further structured to determine the NH3 sensor health value as failed in response to the equation $$NOx(AMOX_{downstream}) > \frac{x}{ANR}(1-\eta_2) + \left(x - \frac{x}{ANR}\eta_2\right);$$

wherein $NOx(AMOX_{downstream})$ comprises the downstream side NOx composition value, wherein x comprises the upstream side $NH_3$ composition value, wherein $\eta_2$ comprises a $NO_x$ conversion efficiency on the SCR catalyst, and wherein ANR comprises an $NH_3$ to $NO_x$ ratio.

10. The system of claim 9, wherein the $NH_3$ sensor diagnostic module is further structured to determine the $NH_3$ sensor health value as failed in-range in response to the $NH_3$ sensor health value being failed, and the value x being within operational limits of the $NH_3$ sensor.

11. The system of claim 1, wherein the $NH_3$ sensor rationality threshold comprises the downstream $NO_x$ composition value.

12. The system of claim 1, wherein the $NH_3$ sensor rationality threshold comprises a multiple of the downstream $NO_x$ composition value, wherein the multiple comprises a value between 0.9 and 8.0.

13. The system of claim 1, wherein the $NH_3$ sensor diagnostic module is further structured to determine the $NH_3$ sensor health value as failed in response to the equation $$NOx(SCR_{downstream}) > \frac{x}{ANR}(1-\eta_2) + \left(x - \frac{x}{ANR}\eta_2\right);$$

wherein $NOx(SCR_{downstream})$ comprises the downstream side $NO_x$ composition value, wherein x comprises the upstream side $NH_3$ composition value, wherein $\eta_2$ comprises a NOx conversion efficiency on the SCR catalyst, wherein ANR comprises an $NH_3$ to $NO_x$ ratio, and wherein k is a cross-sensitivity of the $NO_x$ sensor to $NH_3$.

14. The system of claim 13, wherein the $NH_3$ sensor diagnostic module is further structured to determine the $NH_3$ sensor health value as failed in-range in response to the $NH_3$ sensor health value being failed, and the value x being within operational limits of the $NH_3$ sensor.

15. An electronic controller with instructions on a non-transitory computer readable medium operable to execute a method, comprising:

interpreting an $NH_3$ composition value from an output of an $NH_3$ sensor at a position upstream of a selective reduction catalyst (SCR) element fluidly disposed in the exhaust conduit of an engine;
interpreting a $NO_x$ composition value at a position downstream of the SCR element;
determining an $NH_3$ sensor rationality threshold in response to the upstream $NH_3$ composition value; and
determining an $NH_3$ sensor health value for the $NH_3$ sensor as indicating a sensor failure in response to the downstream $NO_x$ composition value exceeding the $NH_3$ sensor rationality threshold.

16. The method of claim 15, further comprising determining the $NH_3$ sensor health value in response to determining that the SCR catalyst element temperature is within a NOx conversion efficiency range.

17. The method of claim 15, further comprising determining the $NH_3$ sensor health value in response to determining that an ammonia oxidation catalyst (AMOX) positioned downstream of the SCR element is within an $NH_3$ conversion efficiency range.

18. The method of claim 15, further comprising determining the $NH_3$ sensor health value in response to determining that the SCR catalyst element temperature is greater than a storage capacity threshold temperature.

19. The method of claim 15, further comprising estimating a stored $NH_3$ variation value, and wherein the determining an $NH_3$ sensor health value further comprises compensating for the stored $NH_3$ variation value.

20. The method of claim 15, further comprising determining a $NO_x$ conversion efficiency value of the SCR catalyst element, and wherein determining the $NH_3$ sensor rationality threshold is further in response to the $NO_x$ conversion efficiency value.

21. The method of claim 15, further comprising determining a $NO_x$ conversion efficiency value of the SCR catalyst element, determining an $NH_3$ conversion efficiency value of an ammonia oxidation catalyst (AMOX) positioned downstream of the SCR element, and wherein determining the $NH_3$ sensor rationality threshold is further in response to the $NO_x$ conversion efficiency value and the $NH_3$ conversion efficiency value.

22. A system for diagnosing a sensor in an exhaust conduit fluidly coupled to an internal combustion engine operable to produce an exhaust stream as a byproduct of operation, the system comprising:

a selective reduction catalyst (SCR) element fluidly disposed in the exhaust conduit, the SCR catalyst having an upstream side and a downstream side;
an $NH_3$ sensor operationally coupled to the exhaust conduit and structured to provide an upstream side $NH_3$ composition value;
a $NO_x$ sensor operationally coupled to the exhaust conduit at a position downstream of the SCR element and structured to provide a downstream site $NO_x$ composition value; and
an electronic controller to determine an $NH_3$ sensor health value for the $NH_3$ sensor in response to the upstream $NH_3$ composition value and the downstream $NO_x$ composition value.

23. The system of claim 22, wherein the electronic controller is further configured to determine an $NH_3$ sensor rationality threshold in response to the upstream $NH_3$ composition value.

24. The system of claim 23, wherein the electronic controller is further configured to indicate a sensor failure in response to the downstream $NO_x$ composition value exceeding the $NH_3$ sensor rationality threshold.

25. The system of claim 24, wherein the electronic controller is further configured to determine the $NH_3$ sensor health value indicates an in-range failure.

26. The system of claim 24, wherein the $NH_3$ sensor rationality threshold comprises at least one value selected from the values consisting of: the downstream $NO_x$ composition value, a multiple of the downstream $NO_x$ composition value, wherein the multiple comprises a value between 0.9 and 8.0.

27. The system of claim 24, wherein the multiple comprises a value selected from the values consisting of: 0.4, 0.5, 0.8, 0.9, 1.0, 2.0, 2.5, 3.0, and 8.0.

28. The system of claim 22, further comprising an ammonia oxidation catalyst disposed in the exhaust conduit at a position downstream of the $NH_3$ sensor and upstream of the $NO_x$ sensor.

29. The system of claim 28, wherein the electronic controller is further configured to determine whether $NH_3$ sensor check conditions are present, and prevent determining the $NH_3$ sensor health value in response to the $NH_3$ sensor check conditions not being present.

30. The system of claim 29, wherein the $NH_3$ sensor check conditions comprise at least one condition selected from the conditions consisting of: an SCR catalyst element storage capacity being lower than a threshold value, the SCR catalyst element being saturated with adsorbed $NH_3$, a temperature of the SCR catalyst element exceeding a threshold, and an exhaust flow value exceeding a threshold.

31. The system of claim 29, wherein the controller is further configure to perform a sensor failure verification operation.

32. The system of claim 31, wherein the sensor failure verification operation comprises at least one operation selected from the operations consisting of averaging a plurality of sensor test results, incrementing a fault counter in response to a sensor test indicating a failed sensor, decrementing a fault counter in response to a sensor test indicating a passed sensor, integrating the upstream $NH_3$ composition value and the downstream $NO_x$ composition value over a predetermined period of time and comparing the integrated values to the $NH_3$ sensor rationality threshold, and modeling $NH_3$ storage on the SCR catalyst and accounting for the storage in the sensor failure verification operation.

* * * * *